(12) United States Patent
Garcia-Bennett (10) Patent No.: US 8,075,867 B2
(45) Date of Patent: Dec. 13, 2011

(54) METHOD FOR MANUFACTURING A NANOPOROUS FRAMEWORK AND A NANOPOROUS FRAMEWORK THUS PRODUCED

(75) Inventor: Alfonso Garcia-Bennett, Uppsala (SE)

(73) Assignee: Nanologica AB, Stockholm (SE)

( * ) Notice: Subject to any disclaimer, the term of this patent is extended or adjusted under 35 U.S.C. 154(b) by 0 days.

(21) Appl. No.: 11/573,949

(22) PCT Filed: Aug. 19, 2005

(86) PCT No.: PCT/EP2005/009047
§ 371 (c)(1),
(2), (4) Date: Feb. 20, 2007

(87) PCT Pub. No.: WO2006/018320
PCT Pub. Date: Feb. 23, 2006

(65) Prior Publication Data
US 2009/0060830 A1    Mar. 5, 2009

(30) Foreign Application Priority Data
Aug. 20, 2004 (EP) .................................. 04077381

(51) Int. Cl.
*C01B 13/14* (2006.01)
*C01B 33/36* (2006.01)
(52) U.S. Cl. .................................... 423/592.1; 423/702
(58) Field of Classification Search .............. 423/592.1, 423/594.3, 599, 594.9, 700–718
See application file for complete search history.

(56) References Cited

U.S. PATENT DOCUMENTS 4,234,437 A * 11/1980 Friberg et al. .......... 252/62.51 R

OTHER PUBLICATIONS

R. W. Corkery. Artificial biomineralisation and metallic soaps, Dissertation Mar. 1998, Australian NationalUniversity.*
S. Che, A. E. Garcia-Bennett, T. Yokoi, K. Sakamoto, H. Kunieda, O. Terasaki, T. Tatsumi. A novel anionic surfactant templating route for synthesizing mesoporous silica with unique structure, Nature Materials 2003, 2, 801-805.*
A. E. Garcia-Bennett, k. Miyasaka, O. Terasaki. Structural Solution of Mesocaged Material AMS-8, Chem. Mater. 2004, 16, 3597-3605.*
"Transition metal oxide-doped mesostructured silica films" Huesing et al., *Applied Catalysis A: General*, vol. 254, No. 2, Nov. 20, 2003, pp. 297-310.
"Supramolecular templated synthesis of platinum-supported silica" Romero et al., *Chem. Commun.*, 1999, pp. 873-874.

* cited by examiner

*Primary Examiner* — Jerry A Lorengo
*Assistant Examiner* — Carlos Barcena
(74) *Attorney, Agent, or Firm* — Connolly Bove Lodge & Hutz LLP (57) ABSTRACT

The invention concerns a method for manufacturing nanoporous metal oxide or metal active sites frameworks in which the metal oxide precursor is distributed into the framework in the form of a metal soap surfactant.

The invention also covers a nanostructure framework comprising metal oxide active sites which are evenly distributed in the framework.

17 Claims, 6 Drawing Sheets

METHOD FOR MANUFACTURING A NANOPOROUS FRAMEWORK AND A NANOPOROUS FRAMEWORK THUS PRODUCED

CROSS-REFERENCE TO RELATED APPLICATIONS

This application is a National Stage of PCT/EP2005/009047 filed Aug. 19, 2005 which in turn claims priority from European Application 04077381.4, filed Aug. 20, 2004 disclosures of which are incorporated herein by reference.

TECHNICAL FIELD

The present invention is directed to a method for manufacturing nanoporous frameworks by incorporating metal oxide active sites into pores of a mesoporous material and nanoporous frameworks materials thus produced.

BACKGROUND ART

High surface-area materials with nanoscale dimensions are of special interest in applications where active site mediated chemical reactions play an important role, such as catalytic applications where a high contact area between reactants and catalyst is necessary in order to achieve high yield in a cost-effective manner.

Mesoporous materials offer extremely high contact areas by having porosity by means of nanoporous frameworks. The ordered pore structure and defined pore connectivity of the mesoporous materials make them suitable as nano-reactors to confine growth of nano-materials. The challenge to produce materials with controlled size and shape in nanometer scale has been much advanced the mesoporous and related materials.

Major fields of use for nanoporous frameworks are as catalysts. The catalytic applications include applications such as pollution control, water purification, air filtration, mercury remediation as well as their use as catalyst for synthetic purposes such as petroleum refinement, acid catalyst, redox reaction catalyst.

Nanoporous materials can also be used as sensors to detect gas molecules absorbed in the channels.

Another area for the use of nanoporous frameworks is as rechargeable batteries and in fuel cells. The high contact area of the nanoporous framework allows for fast interaction of the active sites with the surrounding media.

The main requirements for the active materials in nanoporous frameworks to be used for catalyst and the like applications are:

High specific surface area
Controlled physicochemical and structural properties
Controlled composition which also allows for the formation of X doped with Y metal oxide, or mixtures of different metal oxides or metals.
Synthesis procedures allowing for homogenous incorporation of metal oxide into the internal and external surfaces of nanoporous framework
Cheap and reliable synthesis procedures Since the discovery of mesoporous materials a great deal of attention has focused on finding practical ways of producing such materials. However, despite the high contact area given by the porous framework researchers still have a problem to produce a material giving high catalytic yields at reasonable cost level. Another problem is that poor hydrothermal stability of the mesoporous silicates produced makes them unsuitable for many catalyst applications. A method for incorporating metal active sites into mesoporous materials is reported by A Corma et al in Chem. Commun, page 1899, 1998. This method relies on costly post-synthetic treatments of the amorphous silica framework.

Transition metal oxide doped silica films have been reported by Huesing et al. in Applied Catalysis A: General 254, page 297-310, 2003. This method although potentially universal does not allow for the formation of metal oxide particles within the voids of the pores as evident from the EXFAS, FTIR and catalytic data presented which suggest that at higher loadings of the metal oxide (M:Si=1:5, where M is Ti) the catalyst sites are less active.

Other attempts include direct formation of metal oxide mesoporous materials by a generalized synthetic route. These processes usually require expensive alkoxide reactants as metal oxide precursors and yields materials where the loading of metal oxide can not exceed the amount of silica in the material.

CVD methods have also been used for incorporation of metallic centers into the channels of mesoporous solids. A problem with these methods are that the pores get blocked which reduces the surface area of these materials and thus their use as a catalyst.

US 2004/0047798 shows an electrode material for an electrical double-layer capacitor consisting of a carbon material having 2-20 nm of mesopore and metal oxides deposited in the pores. The mesoporous carbon material is produced by first preparing an inorganic template/carbon precursor composite in which the inorganic template particles are dispersed in the carbon precursor solution. Secondly the inorganic template/carbon precursor is prepared through carbonization of the carbon precursors surrounding the inorganic templates by heating the inorganic/carbon precursors at 600 to 1500° C. and thirdly to etch the inorganic template/carbon composite with base or acid to remove the inorganic template followed by drying. A post-synthetic deposition of metal oxides for the formation of a carbon/metal oxide composite material is described. A problem with post-synthetic depositions of metal oxide particles is that the incorporation of metal oxide centers will not be homogenous and it is very difficult to control the growth of the metal oxide particles. The internal surface area of the porous material will therefore be reduced and the catalytic activity of such materials is not optimized.

WO 03076702 discloses a method for producing hollow fibers for producing meso-and nanotubes. The method includes the steps of preparing a porous template, add a liquid mixture of the desired tube material, such as a metal precursor, and at least one polymer to the template material in a such a way that the pore surfaces are wetted by the liquid but the pores are not completely filled, solidify the liquid and at least partly remove the template material. WO03064081 (JP2003221601) shows a dispersion and adsorption method upon an already formed non-porous particle. The porosity of the material will depend on the size of the silica particle used. When the silica particles are dissolved the remaining material is in metal form and could not be used in metal oxide form. The system is proposed for providing a porous nano-structured body of a noble metal.

US20040118698 shows a process for preparing of a metal-containing nanostructured film comprising the steps of (a) electrodepositing a metallic composition within the pores of a mesoporous silica film to form a metal-containing silica nanocomposite, (b) annealing the nanocomposite at a temperature in the range of about 25 to 70% of the melting temperature of the metallic composition and (c) removing the silica from the nanocomposite to provide a self-supporting metal-containing nanostructured film.

This method is similar to CVD but here the metal oxide is electrodeposited. Also, this method involves the use of a costly mold prior to the incorporation step.

DESCRIPTION OF THE INVENTION

The present invention involves a method for manufacturing nanoporous frameworks of metal oxides or metals which is simple and cost effective. The invention also refers to a new class of metal oxide- or metal nanoporous material combining novel properties of this type of materials with a distinct controllable porosity and composition, that is, where the amount of metal oxide in the final product exceeds that of the framework element, for example a silica support.

The invention provides the synthesis of a mesoporous structure with a self-organizing metal soap surfactant. This is a great improvement over earlier methods in which the formation of silicate mesoporous material in one instance is followed by impregnation of the mesoporous surface with the metal oxide source.

The metal oxide soap precursors are easily and cheaply prepared. Metal soaps have similar self-organizing properties as conventional amphiphlic surfactants.

The use of self-organizing metal soap reduces the number of steps involved in the production of a metal oxide nanoporous framework. Self-organizing precursors eliminate the need for costly moulds. The cost of impregnation or grafting methods presently used constitutes a main barrier to commercial exploitation of nanoporous materials.

The invention enables the production of metal oxide nanoporous materials controlling the properties such as pore size, pore connectivity, surface area and pore volume. The wide range of variations of such properties encompassed by the invention, allow for the preparation of porous solids with shape selective and adsorption specific properties, which can be used, in a number of catalytic applications.

The invention can be used with all metals that can form a metal soap surfactant. This means that nanoporous frameworks containing any metal oxide or metal can be formed. It is also possible to form nanoporous frameworks with mixtures of metal oxides in any desired compositional range.

The main steps that can be used for manufacturing a nanoporous framework are:
(A) preparing a solution of a metal soap surfactant,
(B) mixing the metal soap surfactant solution with a co-structured directing agent, CSDA,
(C) mixing the solution prepared under step (A) or the mixture prepared under step (B) with a condensing framework,
(D) curing the mixture for forming a stable organic metal-centre/inorganic porous composite,
(E) removing the soap by heat and/or chemical treatment thereby forming a metal oxide nanoporous framework After step (B) it is possible to take the material directly to step (D), thereby not including step (C) in the manufacturing chain. By not including step (C), a stable metal oxide precursor array is formed without a framework to support the encapsulated metal oxide precursor species. The main purpose of the condensing framework is to act as a support for the metal oxide soap precursor.

The condensing framework can be formed from a variety of compounds, for example silica containing compounds or metal alkoxide or other metal compound precursor.

The addition of CSDA followed by control of time-of-addition of the condensing framework facilitates the formation of ordered structures.

If the condensing framework is a non-metal containing compound, for example a silica containing compound, a step (F) can be performed in which the silica is removed.

As an additional step (G), the metal oxide can be reduced to its metallic form for the formation of a metallic nanoporous material.

The invention also encompasses a nanoporous framework having a one, two or three-dimensional array of metal oxide/oxides or metal/metals distributed in the pores of the framework. The use of a metal soap surfactant enables the manufacture of a framework having an even distribution of the metal oxide/oxides or metal/metals within the structure and with compositions where the amount of metal oxide exceeds that of the silica support.

The invention is described in more detail below.

BRIEF DESCRIPTION OF THE DRAWINGS

FIG. 2a shows the low angle XRD pattern of the composite of Example 3.

FIGS. 2b and c, confirm the porosity of the sample and the formation of disordered pore in the silicate/metal oxide composite of Example 3.

FIG. 3a shows diffraction peaks of the silicate cadmium laurate composite of Example 4.

FIGS. 3b-e are electron microscopy images of the silicate-cadmium laurate composite of Example 4.

DETAILED DESCRIPTION OF THE INVENTION

The invention is described in more detail and with reference to the above steps (A) to (G).

Step (A)

In step (A) a metal soap is prepared and dissolved in a water solution.

Preparation of metal soaps has been described in literature. One suitable way of preparing a metal soap involves the common double decomposition method. The metal soaps can be used in their monodentate, bidentate or tridentate coordination.

Examples of metal soaps are:
- Magnesium myristate
- Nickel stearate
- Tin palmitate
- Lanthanum caprylate The use of alkyl chains containing carboxylic acid groups may in addition be used for the formation of metal soap precursors.

More examples of metal oxide soap precursors are:

Alkaline earth:
- Lithium myristate/laurate/stearate/palmitate/caprylate
- Magnesium myristate/laurate/stearate/palmitate/caprylate
- Calcium myristate/laurate/stearate/palmitate/caprylate
- Strontium myristate/laurate/stearate/palmitate/caprylate
- Barium myristate/laurate/stearate/palmitate/caprylate Transition (d-group):
- Chromium myristate/laurate/stearate/palmitate/caprylate
- Manganese myristate/laurate/stearate/palmitate/caprylate
- Iron myristate/lauric/stearate/palmitate/caprylate
- Cobalt myristate/laurate/stearate/palmitate/caprylate
- Nickel myristate/laurate/stearate/palmitate/caprylate
- Copper myristate/laurate/stearate/palmitate/caprylate
- Zinc myristate/laurate/stearate/palmitate/caprylate
- Zirconium myristate/laurate/stearate/palmitate/caprylate
- Ruthenium myristate/laurate/stearate/palmitate/caprylate
- Rhodium myristate/laurate/stearate/palmitate/caprylate
- Palladium myristate/laurate/stearate/palmitate/caprylate
- Silver myristate/laurate/stearate/palmitate/caprylate p-group:
- Aluminum myristate/laurate/stearate/palmitate/caprylate
- Titanium myristate/laurate/stearate/palmitate/caprylate
- Silicon myristate/laurate/stearate/palmitate/caprylate
- Indium myristate/laurate/stearate/palmitate/caprylate
- Tin myristate/laurate/stearate/palmitate/caprylate
- Thallium myristate/laurate/stearate/palmitate/caprylate
- Lead myristate/laurate/stearate/palmitate/caprylate
- Bismuth myristate/laurate/stearate/palmitate/caprylate Lanthanides:
- Lanthanum myristate/laurate/stearate/palmitate/caprylate
- Cerium myristate/laurate/stearate/palmitate/caprylate
- Samarium myristate/laurate/stearate/palmitate/caprylate
- Europium myristate/laurate/stearate/palmitate/caprylate
- Terbium myristate/laurate/stearate/palmitate/caprylate
- Dysprosium myristate/laurate/stearate/palmitate/caprylate
- Holmium myristate/laurate/stearate/palmitate/caprylate
- Erbium myristate/laurate/stearate/palmitate/caprylate The metal oxide soap precursor may be a mixture of different metal soaps.

The weight ration of metal soap to water can be varied from 0.01 to about 10. The weight ratio will affect the thickness of the resulting metal oxide wall in a metal oxide/silica composite. The thickness of the metal oxide wall can thus be varied in the range of 1 to 500 nm.

The preparation period of the metal soap solution should be sufficiently long to allow for the formation of a homogenous mixture. Normally the time needed can vary between 1 and 300 minutes.

The mixture may be heated and stirred in order to facilitate dissolving the metal soap.

The precursor solution can be prepared at temperatures between 50 and 120° C.

Adjustment of pH may also be made.

Step (B)

In step (B) a co-structured directing agent, CSDA, is added to the metal soap solution. The CSDA comprises two moieties:
a) an organic part that binds to or interacts with the metal soap allowing for control of the structural properties of the metal soap,
b) an inorganic part that binds to the condensing framework added in the subsequent step and which allows for control of the structural properties of the condensing framework.

The inorganic part b included in the CSDA can also have the function of encapsulating/enclosing the metal soap thereby enabling the synthesis of a nanoporous structure without performing step (C).

The resulting material in step (B) after addition of CSDA is a stable metal soap-CSDA composite. By varying the time that the metal soap-CSDA composite during step (B) is allowed to stand before proceeding to subsequent steps the structural and porous properties of the final product can be controlled.

For example, the CSDA can be an organosilane group that is added to a solution of a metal soap or a mixture of metal soaps in distilled water with a concentration of 1-40 w % soap.

The amount of organosilane used varies upon the metal soap used in the synthesis, the concentration, the temperature of addition and the desired structural properties of the metal oxide containing silica framework.

The addition of an organosilane imparts a co-structure directing agent effect by interacting with the metal group of the soap. The co-structure directing effect induces the formation of an ordered porous solid and can lead to a variety of resulting framework structures.

Examples of suitable organosilane groups are:
(1) 3-mercaptopropyltrithoxysilane
(2) N-trimethoxysilanepropyl-N,N,N-trimethylammonium-cloride
(3) 3-aminoproyltrimethoxysilane
(4) Phenyltrimethoxysilane Step (C)

In step (C) a condensing framework is added to the solution prepared under step (A) or the mixture prepared under step (B).

The condensing framework acts as a support for the metal oxide soap precursor.

The silica source employed to set the metal soap self-assembling solution can for example be tetraethyl orthosilicate or a commercially available LUDOX silica source.

The silica source is added to the solution at a temperature ranging between room temperature (RT) and 100° C., preferable between 50 to 100° C.

In step (C), a non-silicate framework can also be formed by for example replacing the silica source with a metal alkoxide containing either the same or other metal oxide or oxides as in the metal soap prepared under step (A). The use of a metal alkoxide results in a porous solid with a metal oxide framework.

Other framework sources such as metal nitride, metal chloride, metal sulphate, or metal isopropoxide may also be used in order to condense an inorganic framework surrounding the metal oxide soap precursor.

The preparation leading to homogenization of the synthesis mixture may be facilitated by stirring, heating or adding co-solvents like ethanol, methanol or pyridine.

The condensing framework for example a silica source or metal oxide framework source such as an alkoxy-X (X denotes the desired framework composition) is added to the solution at a pH ranging between 5-1 and a temperature ranging between 60 and 200° C.

This leads to the formation of a framework of polymeric silica or other framework (metal oxide) surrounding the metal oxide precursor.

Step (D)

The formation of a stable organic metal-centre/inorganic framework composite is made at an elevated temperature in the range of 60 to 200° C. The choice of temperature depends on the behaviour of the metal oxide soap precursor used. The duration of the curing process of step (D) varies between 12 to 48 hours depending on the metal soap and condensing framework used.

The curing procedure results in a metal soap containing framework, where the structured metal soap is located within spaces of the framework that will form pores after performance of step (E). This procedure is conducted in a closed vessel that prevents evaporation of reactants during the curing step.

With respect to the morphology of the final product, the processes described under step (C) and (D) can be conducted in a vessel designed to direct the morphology of the final metal oxide/silica composite particles.

It is possible to form monodispersed particles, powders, monoliths, bundles or rods by adjusting the synthesis parameters.

The structural characteristics of the final metal oxide/silicate nanoporous framework can be tailored in order to obtain a defined porosity by adding small amounts of free anionic surfactants.

The porosity of the resulting material can vary between 1-50 nm depending on the synthesis conditions of steps (A), (B), (C) and (D).

The assembly of metal soap surfactants described in the process step (D) above can also be carried out without the use of the framework precursor added in step (C). Instead and to prevent the formation of large metal oxide crystalline particles the addition of a co-structure directing agent (step (B)) has been employed. Upon curing in step (D), the formation of nanoporous frameworks with a crystalline and homogeneous distribution of metal oxide species takes place. In these composites the porosity arises from the voids generated by absence of a silica wall and hence there is no need to perform step (F).

EXAMPLE 1

A Gallium Laurate water solution, containing the monodentate soap, was prepared and heated in a closed polypropylene container to 90° C. for 10 hours to induce the complete dissolution of the soap. The pH of the liquor was adjusted to 10 with tetramethyl ammonium hydroxide solution (25% TMAOH in methanol). To this solution tetraethyl orthosilicate was added at 60° C. under constant stirring (300 rpm). A synthesis gel with molar ratio of 1:1000: 4:1 (Gallium Laurate: water: tetramethyl ammonium hydroxide: Tetraethyl orthosilicate) was formed. The synthesis gel was transferred to a Teflon lined stainless steel autoclave and placed in an oven at 120° C. for 24 hours to encourage condensation of the silica, forming the silica/metal soap composite.

The composite was then heated at 550° C. under flowing oxygen, in order to remove the organic soap, resulting in a porous silicate/gallium oxide composite.

EXAMPLE 2

A Nickel palmitate water solution, containing the monodentate soap, was prepared and heated in a closed polypropylene container to 90° C. for 10 hours to induce the complete dissolution of the soap. The pH of the clear solution was controlled to 9 by addition of Sodium Hydroxide pellets. To this solution, tetraethyl orthosilicate was slowly added at 80° C. whilst stirring before the resulting synthesis gel was transferred into a Teflon lined stainless steel autoclave and placed in an oven at 120° C. for 24 hours to encourage condensation of the silica, forming the silica/metal soap composite. The synthesis gel had a final molar ratio of 1:1000: 12.5:1 (Nickel palmitate: water: tetramethyl ammonium hydroxide: Tetraethyl orthosilicate). At this stage the silicate/nickel oxide (NiO) composite is green in colour indicating.

The composite was then heated at 550° C. under flowing oxygen, in order to remove the organic soap, resulting in a black porous silicate/nickel oxide ($Ni_2O_3$) composite. The low angle X-ray Diffraction (XRD) pattern of this composite is shown in FIG. 1a, and shows clear peaks owing to ordering of pores at the mesoscale.

Figure 1:
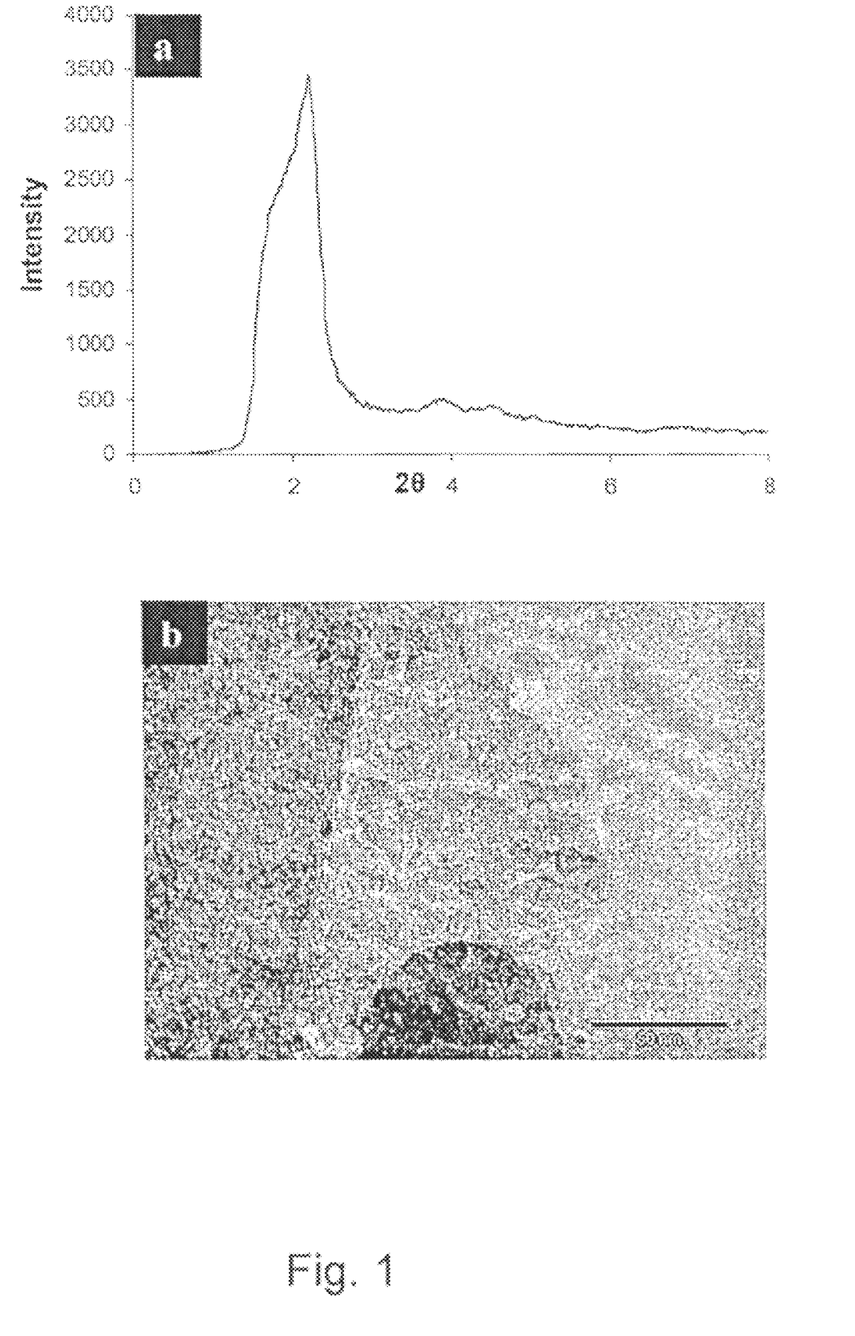
FIG. 1a shows the low angle X-ray Diffraction (XRD) pattern of the composite of Example 2.
FIG. 1b shows high-resolution transmission electron microscope (HRTEM) images of the composite of Example 2.

High-resolution transmission electron microscope (HR-TEM) images of this composite are shown in FIG. 1b.

EXAMPLE 3

Figure 2:
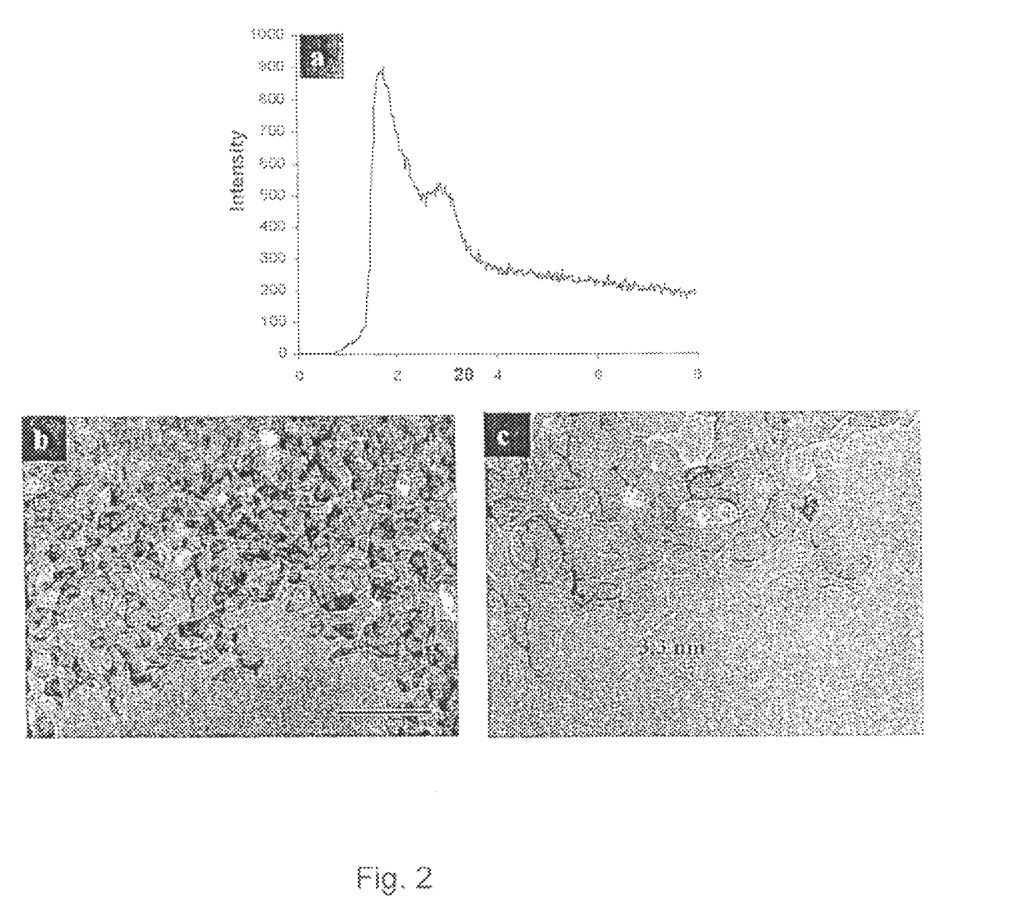

An Erbium laurate water solution was prepared and warmed in a closed polypropylene container to 70° C. for 10 hours to induce the complete dissolution of the soap. To this solution Trimethyl ammonium hydroxide was added, and the solution was stirred for a further 2 hours. Ammonium propyl silane was added followed by tetraethyl orthosilicate. The synthesis gel had a final molar ratio of 1:1000: 12.5:1 (Erbium Laurate: water: tetramethyl ammonium hydroxide: Tetraethyl orthosilicate). The synthesis gel was treated hydrothermally, at 110° C. for 3 days before it was filtered and dried at RT under static air conditions. The alkyl chains of the soap were removed by calcination at 500° C., under flowing oxygen. The low angle XRD pattern, FIG. 2a, contains an intense diffraction peak owing to ordering at the mesoscale. The wide-angle diffraction intensities arise from the formation of a crystalline metal oxide phase. HRTEM images, FIGS. 2b and c, confirm the porosity of the sample and the formation of disordered pore in the silicate/metal oxide composite.

EXAMPLE 4

Figure 3:
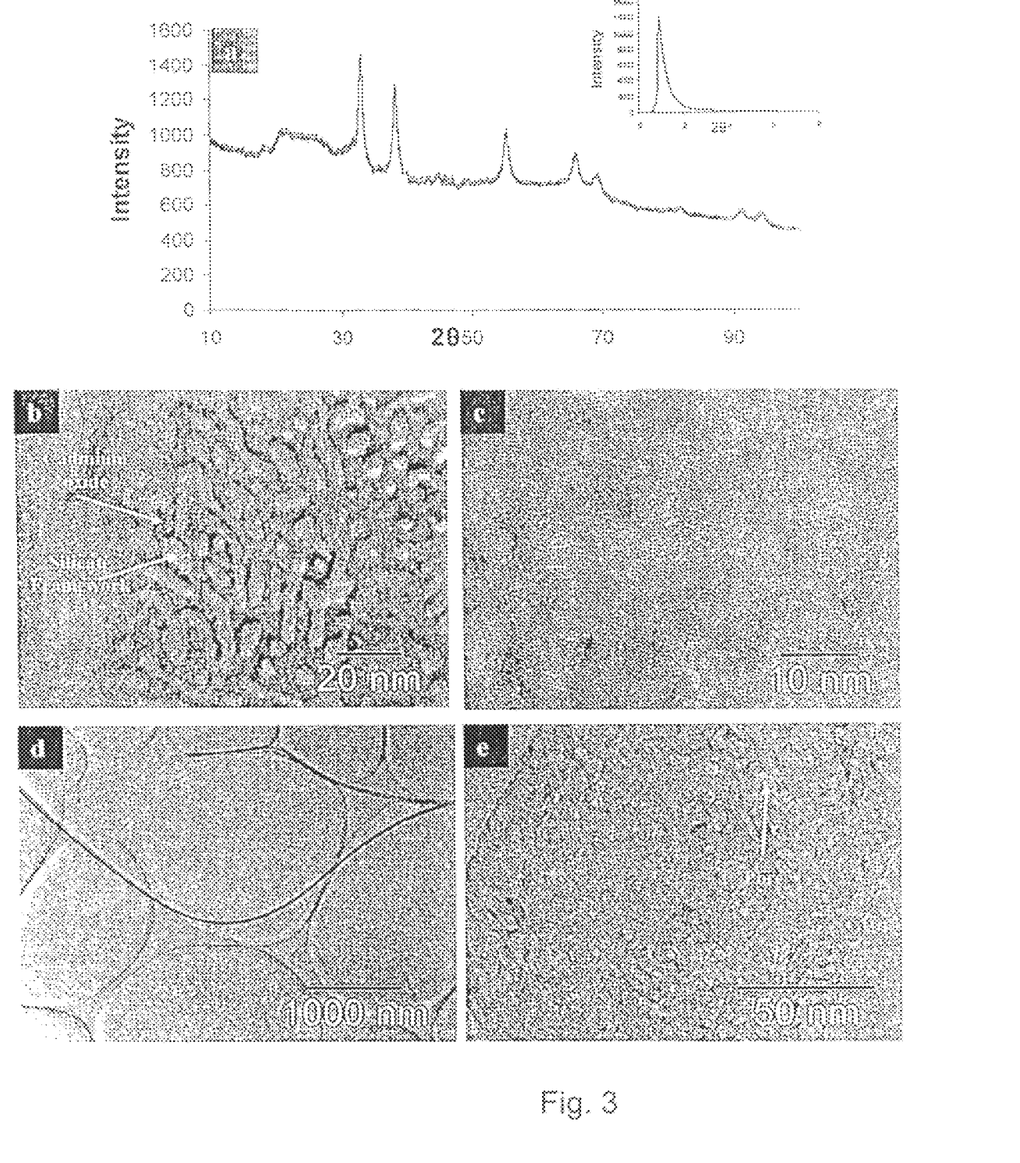
Figure 4:
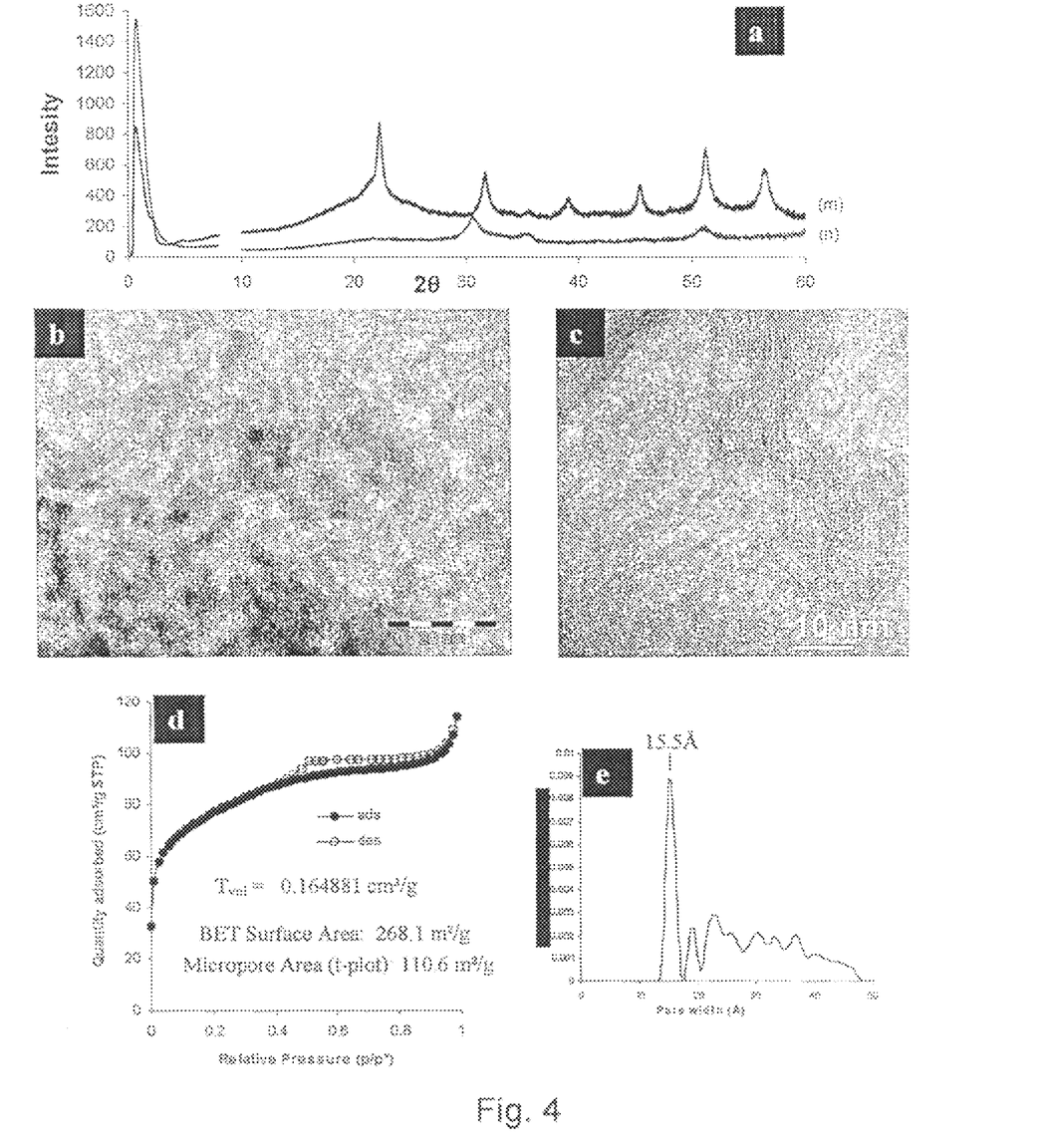
FIG. 4a shows high and low angle XRD patterns of indium oxide/silica composite of Example 5 before and after calcination of soap (m and n respectively).
FIG. 4b shows TEM images of indium oxide porous material of Example 5 after calcination of the alkyl soap.
FIG. 4c shows TEM after removal of the silica source.
FIG. 4d shows nitrogen adsorption isotherm of Example 5.
FIG. 4e shows porosity characteristics and pore size distribution of indium oxide/silica composite of example 5 before removal of the silica framework.

Monodentate cadmium laurate water solution was prepared and heated in a closed polypropylene container to 70° C. for 10 hours to induce the complete dissolution of the soap. Trimethyl ammonium hydroxide was added, and the solution was stirred for a further 30 minutes. To this solution 3-aminopropyltrimethoxysilane was added under constant stirring followed by tetraethyl orthosilicate. The Si/Cd ratio in the synthesis gel is 2 and can be varied in order to control the final properties of the product from Si/Cd 1-100. The resulting silicate cadmium laurate composite showed diffraction peaks corresponding to mesoscale and atomic scale ordering (FIG. 3a). Calcination of the alkyl chains of the soap was conducted as for example 4.

Electron microscopy images, FIGS. 3b-e, of the silicate-cadmium laurate composite shows a 3-dimensional amorphous network of channels containing the cadmium soap, surrounded by an amorphous silica framework. Images recorded at higher magnification indicate that the metal oxide is indeed single crystalline. Removal of the silicate framework using STEP (E) described previously affords a 3-dimensional network of porous cadmium oxide with a wire type of morphology. The length of a typical wire exceeds 3 μm, and the diameter of the pores varies between 5-200 nm.

EXAMPLE 5

Indium palmitate, palmitic acid, tetramethyl ammonium hydroxide and water were mixed together in a polypropylene bottle at 80° C. for 1 day under stirring. To the milky solution, ammonium propylsilane was added drowpise under continuous stirring prior to addition of tetraethyl orthosilicate. The mixture was transferred to a Teflon lined stainless steel autoclave and heated at 165° C. for 2 days. The resulting silicate indium palmitate composite showed diffraction peaks corresponding to mesoscale and atomic scale ordering, FIGS. 4a-e. In particular such figures show: (a) high and low angle XRD patterns of indium oxide/silica composite before and after calcination of soap (m and n respectively); TEM images of indium oxide porous material after calcination of the alkyl soap (b) and after removal of the silica source (c); nitrogen adsorption isotherm (d); porosity characteristics and pore size distribution (e) of indium oxide/silica composite before removal of silica framework Calcination of the alkyl chains of the soap was conducted as for example 4. The silicate framework was dissolved preferentially using a 2 molar solution of NaOH in water, forming a non-silica indium oxide framework.

EXAMPLE 6

Figure 5:
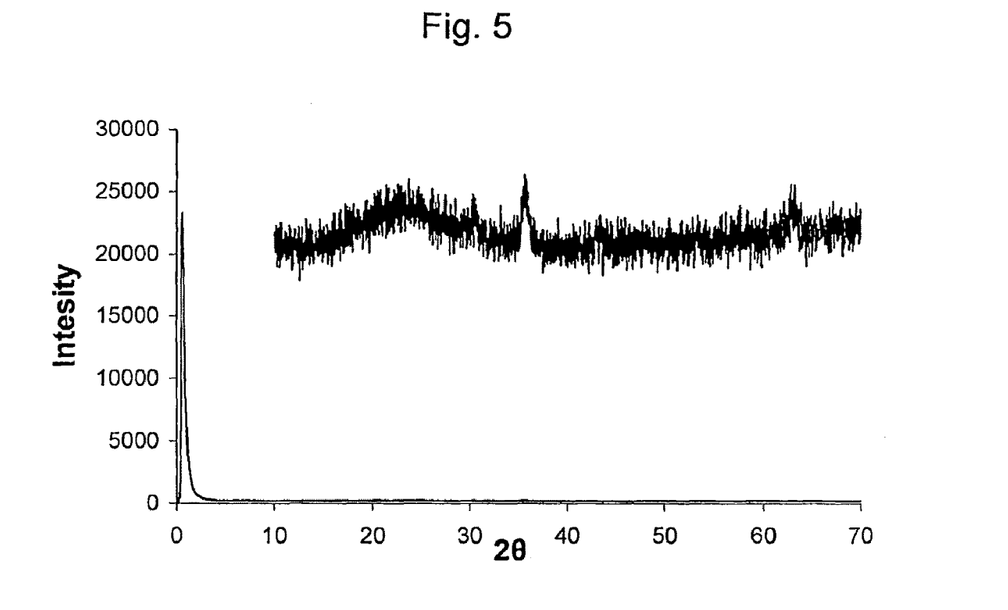
FIG. 5 shows the XRD peaks of the composite of Example 6.

Copper laurate soap (0.2 g) was dissolved in 20 g of distilled water. To allow dissolution of the soap the mixture was heated at 100° C. for 24 hours. To this solution 0.3 g of tetramethyl ammonium hydroxide (25% methanol) base were added to adjust the pH to 10. Finally 3-mercaptopropyltriethoxysilane, (0.3 g) were added together with 0.2 g of tetraethyl orthosilicate under stirring at 80° C. The synthesis gel was transferred to a stainless steel autoclave and heated at 165° C. for 48 hours, before filtering, washing and drying at ambient temperature. The resulting composite shows XRD peaks (FIG. 5), both at high (>20) and low angles (<5) owing to ordering at long-range order and short-range order. XRD peaks remained after calcination of the alkyl chains of the soap to yield the crystalline copper oxide channels.

EXAMPLE 7

Figure 6:
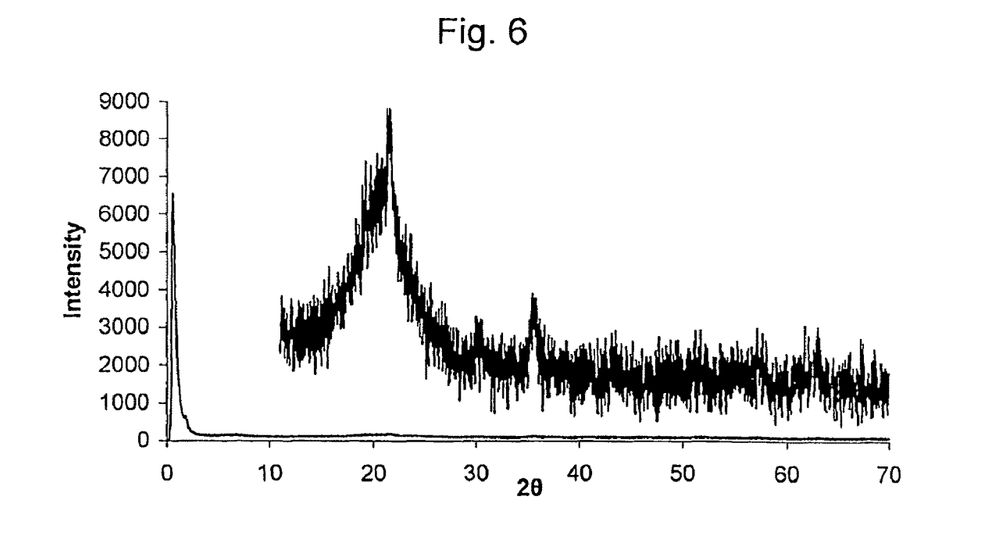
FIG. 6 shows the XRD peaks of the composite of Example 7.

Iron laurate soap (0.2 g) was dissolved in 20 g of distilled water. To allow dissolution of the soap the mixture was heated at 100° C. for 24 hours. To this solution 0.3 g of tetramethyl ammonium hydroxide (25% methanol) base were added to adjust the pH to 10. Finally 3-mercaptopropyltriethoxysilane, (0.3 g) was added together with 0.2 g of tetraethyl orthosilicate under stirring at 80° C. The synthesis gel was transferred to a stainless steel autoclave and heated at 165° C. for 48 hours, before filtering, washing and drying at ambient temperature. The resulting composite shows XRD peaks (FIG. 6), both at high (>20) and low angles (<5) owing to ordering at long-range order and short-range order. XRD peaks remained after calcination of the alkyl chains of the soap was conducted as for example 4.

EXAMPLE 8

Tin laurate soap (0.2 g) and titanium laurate (0.1 g) were dissolved in 30 g of distilled water. To allow dissolution of the soap the mixture was heated at 100° C. for 24 hours. After addition of the relevant base, 3-mercaptopropyltriethoxysilane (0.3 g) was added together with 0.3 g of tetraethyl orthosilicate under stirring at 80° C. The synthesis gel was transferred to a stainless steel autoclave and heated at 165° C. for 48 hours, before filtering, washing and drying at ambient temperature. The resulting composite shows XRD peaks both at high (>20) and low angles (<5) owing to ordering at long-range order and short-range order. Removal of the silica framework yields 3D-nanowire arrays of titanium doped tin (IV) oxide. EDAX analysis of various samples, synthesized with increasing concentrations of titanium laurate indicates a control doping of titanium from Sn/Ti=200-1.

EXAMPLE 9

Figure 7:
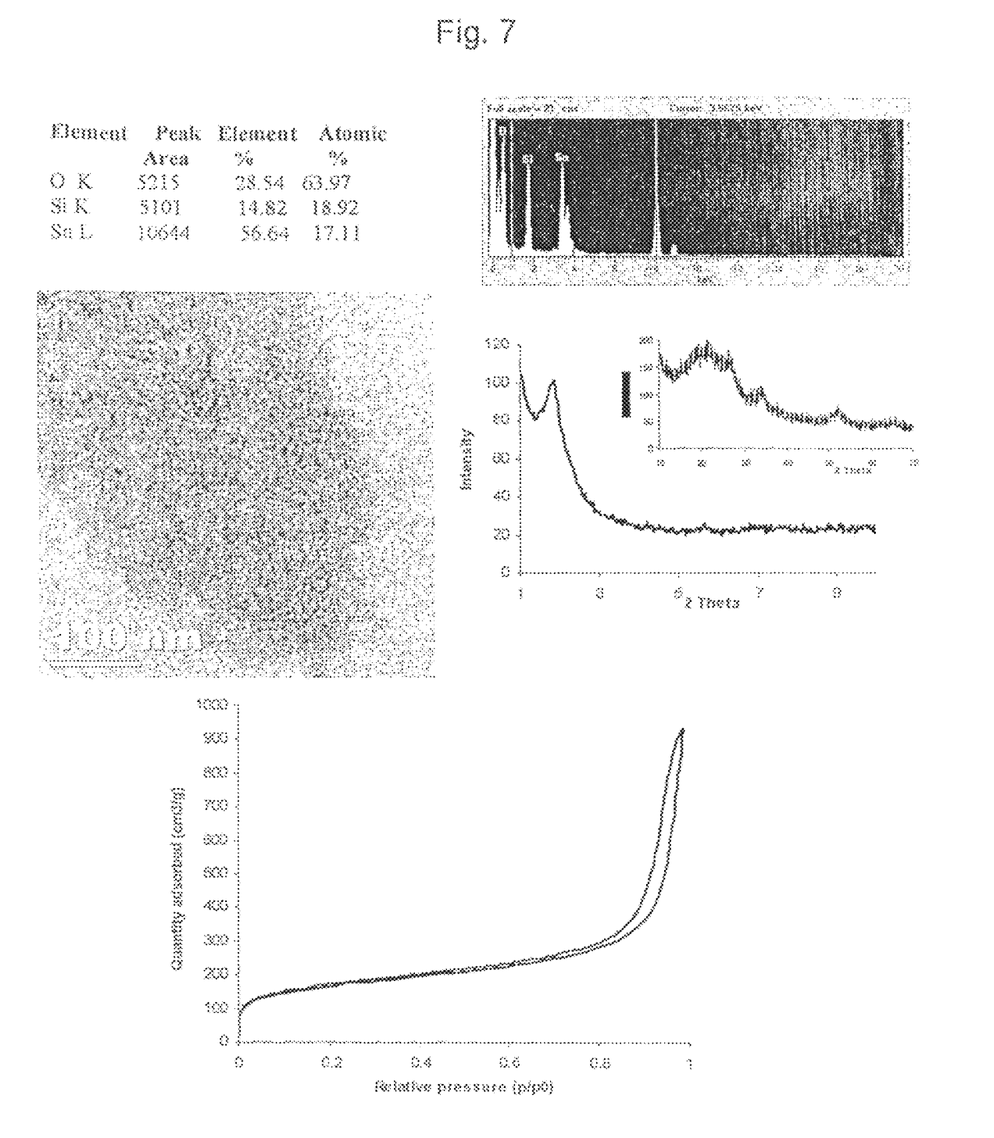
FIG. 7 shows Typical High-Resolution Transmission Electron Microscopy Images of NPF materials and corresponding EDAX analysis spectra of NPF-Sn/Si after removal of soap by calcination; X-ray diffractograms and adsorption isotherm.

Typical High-Resolution Transmission Electron Microscopy Images of NPF materials and corresponding EDAX analysis spectra of NPF-Sn/Si after removal of soap by calcination. X-ray diffractograms and adsorption isotherm are also shown (FIG. 7).

The materials produced within the scope of this invention have a wide variety of applications. For applications where active site mediated chemical reactions play an important role advantageous results are achieved. These are important in catalytic applications where a high contact area between reactants and catalyst is necessary in order to maintain high yields at low cost. Some embodiments include the use of cerium dioxide (ceria) for the treatment of exhaust gases (CO, NO, hydrocarbons) from sparked-ignited combustion engines and supported cobalt catalysts for Fischer-Tropsch synthesis of higher hydrocarbons from natural gas.

The invention claimed is:

1. A method for manufacturing a nanoporous framework containing metal oxide active sites using a metal soap surfactant as a metal oxide precursor to incorporate metal oxide sites into the nanoporous framework, the method comprising:
   (A) preparing a solution of a metal soap surfactant, wherein the metal soap surfactant is a laurate, stearate, palmitate, or caprylate of a metal selected from the group consisting of magnesium, calcium, strontium, barium, chromium, manganese, iron, cobalt, nickel, copper, zinc, zirconium, ruthenium, rhodium, palladium, silver, aluminium, titanium, silicon, indium, tin, thallium, lead, bismuth, lanthanum, cerium, samarium, europium, terbium, dysprosium, homium, erbium, and mixtures thereof,
   (B) mixing the metal soap surfactant solution with a condensing framework,
   (C) curing the mixture for forming a stable organic metal-centre/inorganic porous composite,
   (D) removing the soap by heat and/or chemical treatment thereby forming a metal oxide nanoporous framework.

2. A method for manufacturing a nanoporous framework containing metal oxide active sites according to claim 1, wherein the method further comprises mixing the metal soap surfactant solution of (A) with a co-structure directing agent (CSDA).

3. A method for manufacturing a nanoporous framework containing metal oxide active sites according to claim 2, wherein the condensing framework comprises a metal nitride, chloride, sulphate or isopropoxide.

4. A method for manufacturing a nanoporous framework containing metal oxide active sites according to claim 2, wherein the condensing framework includes a silica source compound.

5. A method for manufacturing a nanoporous framework containing metal oxide active sites according to claim 4, wherein the silica is removed after curing.

6. A method for manufacturing a nanoporous framework containing metal oxide active sites according to claim 5, wherein an additional step is performed under which the metal oxide/oxides active sites are reduced to metallic state.

7. A method for manufacturing a nanoporous framework containing metal oxide active sites according to claim 2, wherein the condensing framework is a metal oxide precursor.

8. A method for manufacturing a nanoporous framework containing metal oxide active sites according to claim 7, wherein the metal oxide precursor is an alkoxide containing either the same or other metal oxide or oxides as in the metal soap prepared under (A).

9. A method for manufacturing a nanoporous framework containing metal oxide active sites according to claim 2, wherein the metal soap surfactant comprises more than one metal.

10. A method for manufacturing a nanoporous framework containing metal oxide active sites according to claim 2, wherein ordering of the framework through induced phase transformations by addition of the CSDA is followed by control of time-of-addition of adding the condensing framework.

11. A method for manufacturing a nanoporous framework containing metal oxide active sites according to claim 1, wherein the condensing framework includes a silica source compound.

12. A method for manufacturing a nanoporous framework containing metal oxide active sites according to claim 11, wherein the silica is removed after curing.

13. A method for manufacturing a nanoporous framework containing metal oxide active sites according to claim 12, wherein an additional step is performed under which the metal oxide/oxides active sites are reduced to metallic state.

14. A method for manufacturing a nanoporous framework containing metal oxide active sites according to claim 1, wherein the condensing framework is a metal oxide precursor.

15. A method for manufacturing a nanoporous framework containing metal oxide active sites according to claim 14, wherein the metal oxide precursor is an alkoxide containing either the same or other metal oxide or oxides as in the metal soap prepared under (A).

16. A method for manufacturing a nanoporous framework containing metal oxide active sites according to claim 1, wherein the metal soap surfactant comprises more than one metal.

17. A method for manufacturing a nanoporous framework containing metal oxide active sites according to claim 1, wherein the condensing framework comprises a metal nitride, chloride, sulphate or isopropoxide.

* * * * *